(No Model.)
G. H. GRIFFIN.
NUT LOCK.
No. 396,691. Patented Jan. 22, 1889.
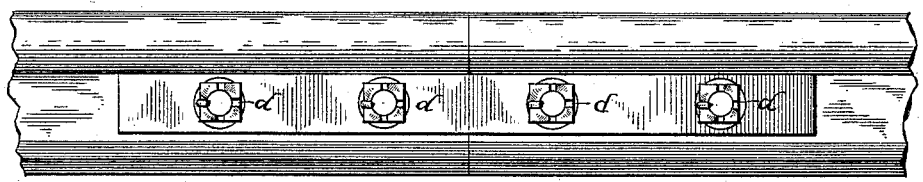
Fig. 1.
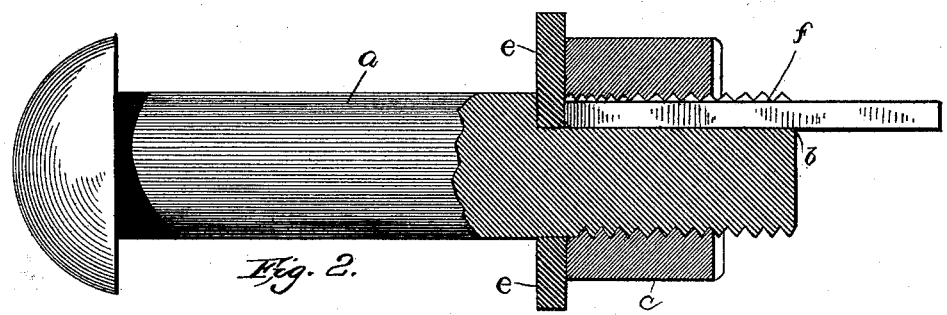
Fig. 2.
Fig. 3.
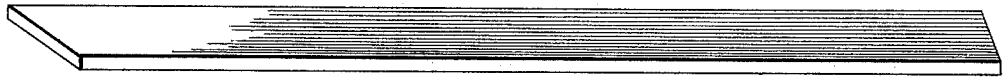
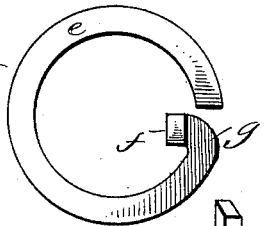
Fig. 5.
Fig. 4.
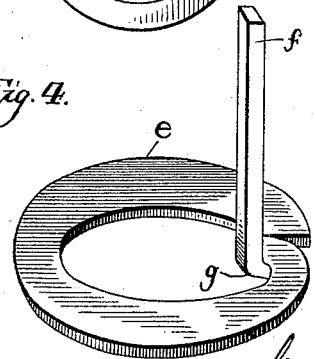
WITNESSES.
C. A. Werle
H. E. Peck.
INVENTOR
Geo. H. Griffin
per O. E. Duff
Attorney

UNITED STATES PATENT OFFICE.

GEORGE H. GRIFFIN, OF ABINGDON, VIRGINIA.

NUT-LOCK.

SPECIFICATION forming part of Letters Patent No. 396,691, dated January 22, 1889.

Application filed August 30, 1888. Serial No. 284,125. (No model.)

*To all whom it may concern:*

Be it known that I, GEORGE H. GRIFFIN, of Abingdon, in the county of Washington and State of Virginia, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in nut-locks, and more particularly to an improvement of the construction shown, described, and claimed in an application filed by me February 27, 1888, Serial No. 265,357, allowed May 19, 1888, for an improvement in nut-locks.

The invention consists in certain novel features of construction and combinations of parts, more fully described hereinafter, and particularly pointed out in the claim.

Referring to the accompanying drawings, Figure 1 is an elevation of the joint between two rails, showing the improved nut-lock in position. Fig. 2 is a side view of the device, the nut, washer, and tongue being shown in section with the tongue in position to be bent over into one of the grooves in the nut. Fig. 3 is a view of a bar of metal from which a washer and its locking-tongue are formed. Fig. 4 is a perspective view of the completed washer and its locking-tongue ready to be applied to the bolt and nut. Fig. 5 is a top plan view of the complete washer.

In the drawings, the reference-letter $a$ indicates any suitable bolt provided with a longitudinal groove, $b$, in its threaded portion, as shown in Fig. 2.

A nut, $c$, is provided to screw upon the bolt, and said nut can be of any desired external contour, preferably provided with radially-extending slots or grooves $d$ in its outer face or end. These grooves are preferably inclined or beveled in one direction, so that the free end of the locking-tongue when bent over upon the nut can slip over the notches in one direction, when it is desired to tighten the nut, but will lock the nut when the same is turned in the opposite direction.

A washer, $e$, preferably, although not necessarily, circular in form, is located upon the bolt beneath the nut, and is provided with a locking-tongue, $f$, formed integral with and extending upwardly at right angles from the same.

In assembling the parts of the locks the washer is first placed upon the bolt with its locking-tongue resting in the groove of the bolt. The nut is then screwed tightly down upon the washer, with the tongue extending up through the groove above the same. When the nut is in position, the free end of the tongue is bent over into one of the notches in the outer face of the nut, thus firmly locking the same in position and to the bolt.

The improvement in the present case consists, essentially, in the construction of the washer and locking-tongue, which is as follows, viz: The washer and its locking-tongue are formed from a single bar or piece of suitable metal, (see Fig. 3,) which is first bent circular to form the washer of suitable size and provided with the usual central opening for the passage of the bolt and with the free ends, as seen. One of said ends is then bent inwardly to a position extending about diametrically across the central opening of the washer, and is then bent so as to extend upwardly in a plane approximately at right angles to the plane of the washer, and with the end $g$ of the washer extending inwardly before bending upwardly to form tongue $f$, as clearly shown, so that the locking-tongue will fit snugly in the groove in the bolt with its outer face lying beneath the edges of the said groove or periphery of the bolt. This construction of washer and tongue is found to be a great improvement over that set forth in the application mentioned. The fiber of the metal is injured by the stamping and cutting process, and it leaves the grain running transversely across the washer; and, further, the free ends of the old form of washer catch on the corners of the nut, besides possessing other disadvantages obvious to all persons, and hence not considered necessary to fully set forth herein. In the present construction the grain of the metal runs with the length of the washer and tongue; hence the maximum strength is attained and an article of great cheapness and durability produced, the process of manufacturing being extremely cheap and simple.

Having thus fully described my invention, what I claim as new, and desire to secure by Letters Patent, is—

A nut-lock consisting of a longitudinally-grooved bolt, a nut, a locking-washer provided with a washer portion embracing the bolt beneath the nut, and a locking-tongue resting in the groove and having its free end bent laterally to hold the nut, said lock consisting of an integral metal bar having a portion of its length bent to form the washer portion and the remainder of its length extending inwardly from one of the ends of the washer portion and then upwardly at right angles to the plane of the same, substantially as described.

In testimony that I claim the foregoing as my own I affix my signature in presence of two witnesses.

GEORGE H. GRIFFIN.

Witnesses:
R. E. BOLLING,
D. A. PRESTON.